W. W. SPEARMAN.
REAR AXLE CASING.
APPLICATION FILED JUNE 21, 1917.
1,248,739. Patented Dec. 4, 1917.
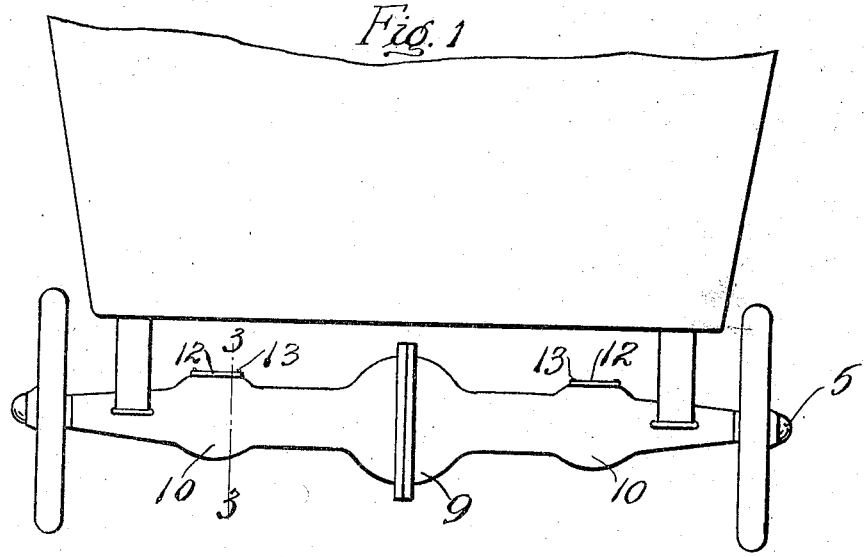
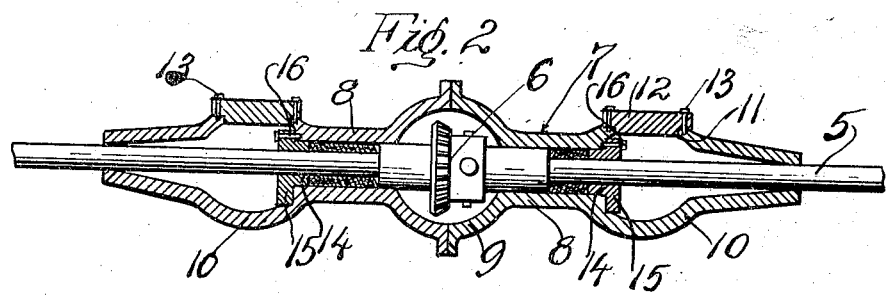
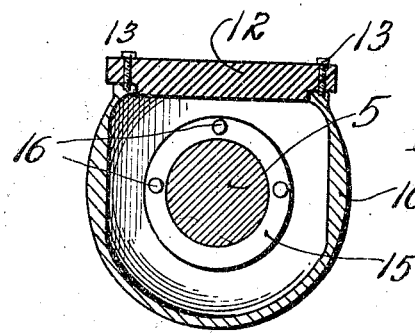
Witnesses
Inventor
W. W. Spearman
By Charles Chandlee
Attorneys

UNITED STATES PATENT OFFICE.

WALTER W. SPEARMAN, OF MULBERRY, FLORIDA.

REAR-AXLE CASING.

1,248,739.   Specification of Letters Patent.   Patented Dec. 4, 1917.

Application filed June 21, 1917. Serial No. 176,139.

*To all whom it may concern:*

Be it known that I, WALTER W. SPEARMAN, a citizen of the United States, residing at Mulberry, in the county of Polk, State of Florida, have invented certain new and useful Improvements in Rear-Axle Casings; and I do hereby declare the following to be a full, clear, and exact description of the invention, such as will enable others skilled in the art to which it appertains to make and use the same.

This invention is an improvement in motor vehicles and has particular reference to a casing for the rear axle thereof.

An object of the invention is to provide a casing in which the rear axle is so mounted that the lubricant in the differential housing, forming a part of said housing, will be retained therein and prevented from flowing to the ends of the axle.

Another object is to provide a casing for rear axles which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a fragmentary rear elevation of an automobile showing the casing applied to the rear axle and constructed in accordance with the invention.

Fig. 2 is a longitudinal section through the rear axle.

Fig. 3 is a section on the line 3—3 of Fig. 1.

In the drawing the numeral 5 indicates the rear axle of the vehicle with which is associated the differential gearing 6 of any conventional form.

The casing generally indicated by the numeral 7 is preferably formed of complemental sections 8 surrounding the axle in spaced relation, the inner ends of the sections being enlarged to provide a housing 9 for the gearing 6 while the intermediate portion of each section 8 is also enlarged as indicated at 10 and provided with an opening 11 normally closed by a movable cover plate 12 secured to the enlarged portion 10 by suitable fasteners 13.

The opening 11 in each section of the casing forms a chamber which is intersected by the longitudinal opening of the casing for receiving the axle and insertible through the opening 11 and into said chamber, and engageable in the axle opening of the casing is a combined bearing and stuffing box 14 in which the axle 5 is journaled and which is provided with a flange 15 for securing said stuffing box, by fasteners, 16, to the wall of the chamber adjacent the differential housing. These stuffing boxes may be readily removed and replaced by first detaching the cover plate 12 whereby access may be had to said boxes and it will be apparent that while in position the same will effectively prevent the passage of oil or other lubricant from the differential housing into the outer ends of the sections of the casing thereby retaining said lubricant within said housing so that the gearing will at all times be properly lubricated.

What is claimed is:—

1. In a motor vehicle, the combination of a rear axle and the differential gearing therefor, a sectional casing surrounding said axle in spaced relation thereto, the sections of each casing being enlarged at their inner ends to provide a housing for said gearing, each section of said casing being further provided with a chamber intermediate the ends thereof, a stuffing box insertible into said chamber and surrounding and forming a bearing for said axle whereby to prevent a lubricant passing from said housing into said chamber, and a removable cover for said chamber.

2. In a motor vehicle, the combination of a rear axle and the differential gearing therefor, a casing for said rear axle having a portion forming a housing for said gearing and also having a chamber formed on each side of said housing, and means insertible into said chambers and between the same and said housing for preventing the passage of a lubricant from the latter to the ends of said casing.

In testimony whereof, I affix my signature in the presence of two witnesses.

WALTER W. SPEARMAN.

Witnesses:
JOHN H. SMITH,
H. J. KOERNER.